United States Patent
Kumaraswamy

(10) Patent No.: US 10,848,773 B1
(45) Date of Patent: Nov. 24, 2020

(54) MACHINE LEARNING-BASED ENCODING AND DECODING

(71) Applicant: Xilinx, Inc., San Jose, CA (US)

(72) Inventor: Muthukumar Kumaraswamy, Cupertino, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/534,629

(22) Filed: Aug. 7, 2019

(51) Int. Cl.
| | | |
|---|---|---|
| *H04N 19/103* | (2014.01) | |
| *H04N 19/31* | (2014.01) | |
| *H04N 19/176* | (2014.01) | |
| *H04N 19/85* | (2014.01) | |
| *G06N 20/00* | (2019.01) | |
| *H04N 19/172* | (2014.01) | |

(52) U.S. Cl.
CPC ............ *H04N 19/31* (2014.11); *G06N 20/00* (2019.01); *H04N 19/172* (2014.11); *H04N 19/176* (2014.11); *H04N 19/85* (2014.11)

(58) Field of Classification Search
CPC .... H04N 19/31; H04N 19/176; H04N 19/172; H04N 19/85; G06N 20/00
See application file for complete search history.

(56) References Cited

U.S. PATENT DOCUMENTS

| | | | | |
|---|---|---|---|---|
| 7,689,531 | B1* | 3/2010 | Diao | G06N 20/00 706/62 |
| 2011/0213736 | A1* | 9/2011 | Diao | G06N 20/00 706/12 |
| 2018/0173994 | A1* | 6/2018 | Rippel | G06K 9/6256 |
| 2018/0192046 | A1* | 7/2018 | Teo | H04N 19/82 |
| 2018/0314963 | A1* | 11/2018 | Kovacs | G06N 3/0454 |
| 2019/0273510 | A1* | 9/2019 | Elkind | G06F 8/74 |

* cited by examiner

*Primary Examiner* — Howard D Brown, Jr.
(74) *Attorney, Agent, or Firm* — Crawford Maunu PLLC

(57) ABSTRACT

Approaches for encoding include inputting a time-ordered sequence of source data to a machine learning (ML) encoder circuit. The ML encoder circuit extracts first features from a first subset of the source data and generates an ML model from the first features. The ML encoder circuit outputs the first subset of source data while generating the ML model and the ML model is incomplete. Once completed, the ML encoder circuit outputs the ML model for decoding subsequently extracted features. Thereafter, the ML encoder circuit extracts second features from a second subset of the source data and outputs the second features for decoding using the ML model.

20 Claims, 6 Drawing Sheets

MACHINE LEARNING-BASED ENCODING AND DECODING

TECHNICAL FIELD

The disclosure generally relates to use of machine learning techniques in encoding and decoding data.

BACKGROUND

Finite storage and communication resources drive many data processing applications to compress data in order to reduce the quantity of data stored or transmitted. Compression techniques range from lossless compression to lossy compression. Comparatively, lossy compression techniques tend to provide a greater compression ratio of source-to-compressed data than do lossless compression techniques. Lossless compression techniques tend to provide a more accurate rendering of the decompressed data relative to the source data than do lossy compression techniques.

Data bandwidth and storage demands continue to increase with the deployment of hardware that supports 4K and 8K video resolutions, high-resolution audio data, and holographic data, for example. With the significant increases in data demands, the reduction provided by lossless compression techniques may be insufficient for some hardware, and information loss resulting from lossy compression techniques may be too great.

SUMMARY

A disclosed encoding method includes inputting a time-ordered sequence of source data to a machine learning (ML) encoder circuit. The method includes extracting by the ML encoder circuit, first features from a first subset of the source data and generating an ML model from the first features by the ML encoder circuit. The ML encoder circuit outputs the first subset of source data while generating the ML model and the ML model is incomplete. The ML encoder circuit outputs the ML model for decoding subsequently extracted features. The method further includes extracting by the encoder circuit after extracting the first features, second features from a second subset of the source data. The second subset of the source data follows the first subset of the source data in the sequence. The method includes outputting by the ML encoder circuit, the second features for decoding using the ML model.

A disclosed decoding method includes inputting to a machine learning (ML) decoder circuit, a time-ordered sequence of data output by an ML encoder circuit. The sequence of data includes in input order a first subset of source data, a first ML model, and a first set of features. The ML encoder circuit in performing the method outputs the first subset of source data in response to input of the first subset of source data and decodes the first set of features into a first set of inferred source data using the first ML model in response to input of the first set of features. The decoding method includes outputting the first set of inferred source data by the ML decoder circuit.

A disclosed system includes a machine learning (ML) encoder circuit. The ML encoder circuit is configured to input a time-ordered sequence of source data and extract first features from a first subset of the source data and generate an ML model from the first features. The ML encoder circuit is configured to output the first subset of source data while generating the ML model and the ML model is incomplete. The ML encoder circuit is configured to output the ML model for decoding subsequently extracted features once the ML model is complete. The ML encoder circuit is configured to extract second features from a second subset of the source data after extracting the first features. The second subset of the source data follows the first subset of the source data in the sequence. The ML encoder circuit is configured to output the second features for decoding using the ML model.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

Figure 1:
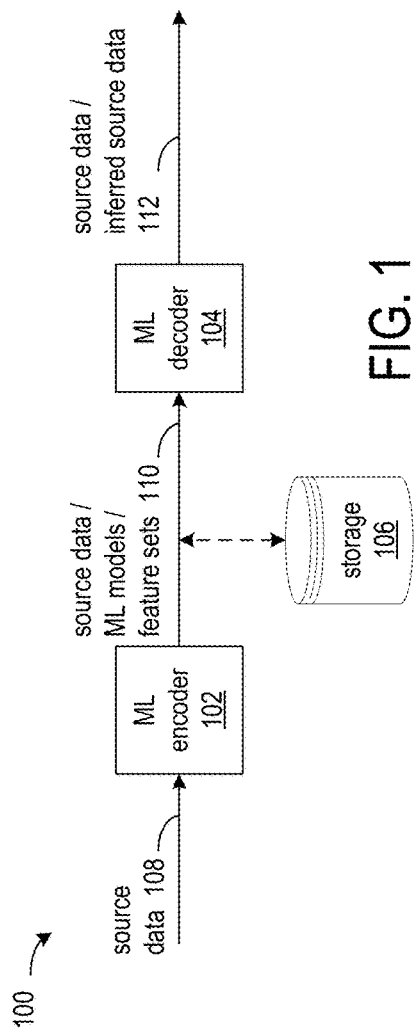
FIG. 1 shows a system in which source data is encoded and decoded using ML techniques.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Machine learning (ML) generally involves the development of statistical models from patterns and features in one data set, and use of the models to make inferences from features extracted from another data set. ML applications include, for example, image recognition, voice recognition, language translation, computer vision, email filtering, medical diagnosis, business problems, market forecasting, etc. In accordance with the disclosed approaches, ML techniques can be employed to reduce data bandwidth and/or storage requirements in various applications.

According to the disclosed approaches, ML models are generated on-the-fly as source data is being provided for storage or transmission over a communication channel. While extracting features from the source data and generating an ML model and until the ML model is complete, an ML encoder circuit outputs the source data.

Once the ML model is complete, the ML encoder circuit outputs the ML model and thereafter extracts features from the source data and outputs the features instead of the source data. The reduction provided by extracting features from the source data and outputting the features instead of outputting the source data can range from $\frac{1}{10}$ to $\frac{1}{1000}$ of the quantity of the source data, depending on the application. The output source data, ML model, and extracted features can be stored in retentive storage for subsequent retrieval and decoding, or transmitted to an ML decoder circuit that is decoding as data is received from the ML encoder circuit.

The ML encoder circuit monitors the source data for a major change, which would make the current ML model ineffective. In response to detecting a major change, the ML encoder circuit returns to outputting the source data and proceeds to generate a replacement ML model. Once the replacement ML model is complete, the ML encoder circuit outputs the replacement ML model and thereafter extracts features from the source data and outputs the features instead of the source data.

An ML decoder circuit 104 processes the data provided by the ML encoder circuit and outputs data 112 that is either source data or inferred source data, depending on the data received from the ML encoder circuit 102. For source data provided by the ML encoder circuit, the ML decoder circuit outputs that source data as no ML decoding is needed. In response to receiving an ML model, the ML decoder circuit activates the received ML model for use in producing output data based on features received from the ML encoder circuit.

The application of ML techniques to data encoding reduces bandwidth and data storage requirements in a number of applications, and provides computing advantages. For example, the ML data encoding techniques can be employed in video applications ranging from video-conferencing to the transmission of high-resolution images and video data from space craft to earth. The ML data encoding techniques can be applied to auto-scaling of video data or used to correct or adjust images/frames. Computation resources can be reduced by applying ML data encoding to source data and encrypting output from the ML encoder circuit.

FIG. 1 shows a system 100 in which source data is encoded and decoded using ML techniques. The ML encoder circuit 102 inputs source data 108. The source data is a time-ordered sequence in that features found in a subset of the source data input beginning at time $t_i$, can be used to generate an ML model, and the ML model can thereafter be used (by the ML decoder circuit) to infer information about a subsequent subset of the source data that is input beginning at time, $t_j$ ($t_j$ is later than $t_i$) based on features found in the subsequent subset. The input of the source data can be packet-based, streamed, by direct memory access, etc. The source data can be in any format. For example, the source data can be video data, audio data, textual data, etc. The source data can also be compressed or uncompressed.

The ML encoder circuit 102 inputs the source data and outputs data 110 based on the current state of the source data and ML model. Generally, the ML encoder circuit extracts features from the source data, generates an ML model, outputs the source data while the ML model is being generated, and outputs the ML model when complete. For source data input after the ML model is complete, the ML encoder circuit extracts features and outputs the features instead of the source data.

The ML encoder circuit also monitors the source data for changes that would make the current ML model ineffective. In response to detecting such a major change, the ML encoder circuit generates a replacement ML model and reverts to outputting the source data while the replacement ML model is being generated.

Depending on the application, the data output by the ML encoder circuit can be transmitted to the ML decoder circuit for real-time decoding, or the output data can be stored in retentive storage 106 and later retrieved for decoding by the ML decoder circuit. "Real-time" decoding refers to a rendering of data by the ML decoder circuit in a manner that appears to a consumer of the data to be a version of the source data delayed only by the encoding, transmission, and decoding. Retentive storage can be implemented by hard disk drives (HDDs), solid state drive (SSDs), and/or solid state hybrid drives (SSHDs), for example. The ML decoder circuit, retentive storage, and ML decoder circuit can be intercoupled by a computer system bus(es) and/or one or more wired and/or wireless interconnected networks. Data and control signals can be communicated by stream, direct memory access, packets, etc. For real-time applications, ML encoder circuit and ML decoder circuit can employ handshake signals to coordinate transmission of source data, ML models, and features from the ML encoder circuit to the ML decoder circuit.

The ML decoder circuit 104 inputs the data provided by the ML encoder circuit 102, either by way of communicating with the ML encoder circuit or by retrieval from retentive storage 106. In response to receiving source data, the ML decoder circuit bypasses application of the ML model and outputs the source data for subsequent processing, such as rendering frames of video data by a video driver. In response to receiving an ML model, the ML decoder circuit activates the received ML model for use in decoding subsequently received features. In response to receiving features, the ML decoder circuit uses the active ML model to decode and infer the content of the corresponding source data from which the features were extracted.

The ML encoder circuit 102 and ML decoder circuit can be implemented in programmable logic circuitry, an application-specific integrated circuit (ASIC), a microprocessor executing software, or any combination of the foregoing.

Figure 2:
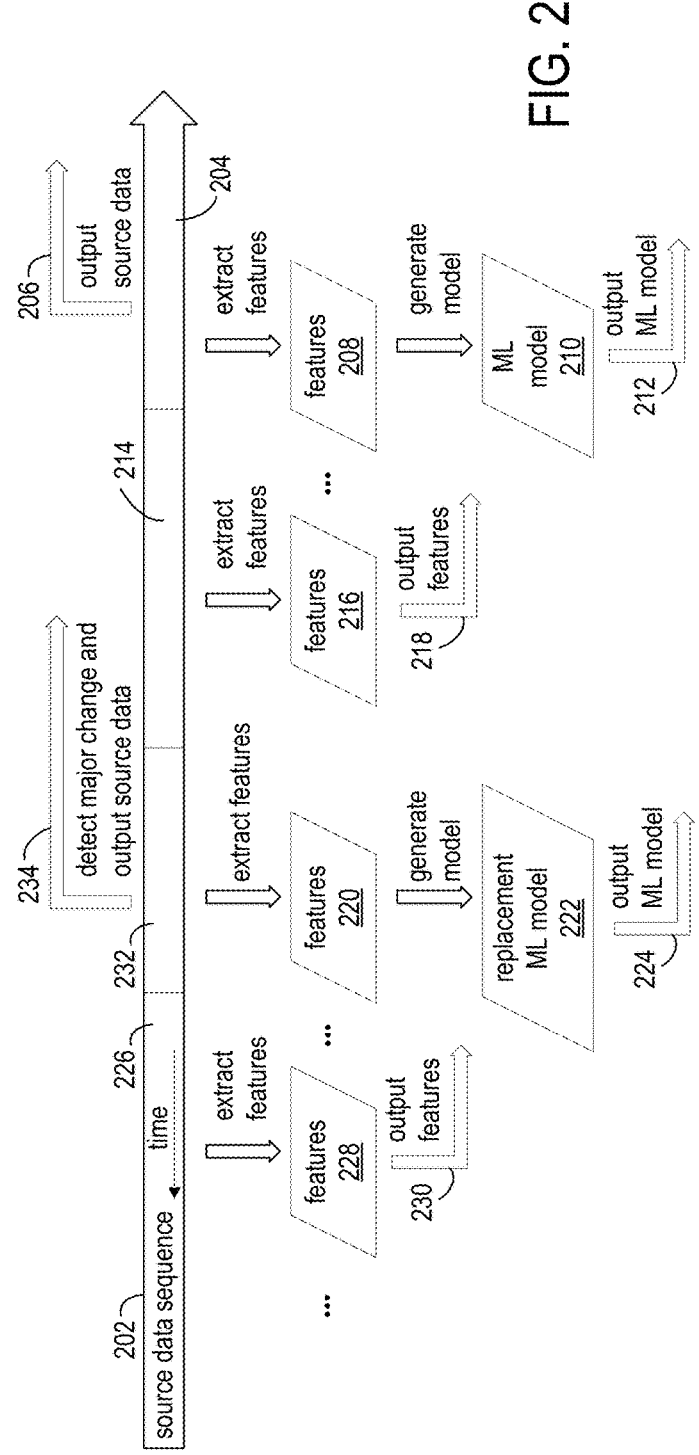
FIG. 2 illustrates a sequence of source data and the processing of the sequence by the ML encoder circuit.

FIG. 2 illustrates a sequence of source data 202 and the processing of the sequence by the ML encoder circuit. The time order of the sequence is from right to left. The earliest input data in the exemplary sequence is source data subset 204. If no ML model has yet been generated, the ML encoder circuit outputs the source data subset 204 while features 208 are extracted from the subset and the ML model 210 is generated. Once the ML model is complete, the ML encoder circuit outputs 212 the ML model.

As additional source data is input, such as source data subset 214, and subsequent to completion of the ML model 210, the ML encoder circuit continues to extract features 216 and outputs 218 those features instead of the source data subset 214. The ML model 210 can be used to infer the content of the source data subset 214 by the ML decoder circuit.

The ML encoder circuit monitors the sequence of source data for changes that would render the ML model 210 ineffective. In response to detecting a major change in source data subset 232, the ML encoder circuit outputs 234 the source data subset 216, extracts features 220 from the subset, and generates replacement ML model 222. Once the replacement ML model 222 is complete, the ML encoder circuit outputs 224 the replacement ML model for use by the ML decoder circuit.

As additional source data is input, such as source data subset 226, subsequent to completion of the replacement ML model 222, the ML encoder circuit continues to extract features 228 and output 230 those features instead of the source data subset 226. The replacement ML model 222 can be used to infer the content of the source data subset 226 by the ML decoder circuit.

Figure 3:
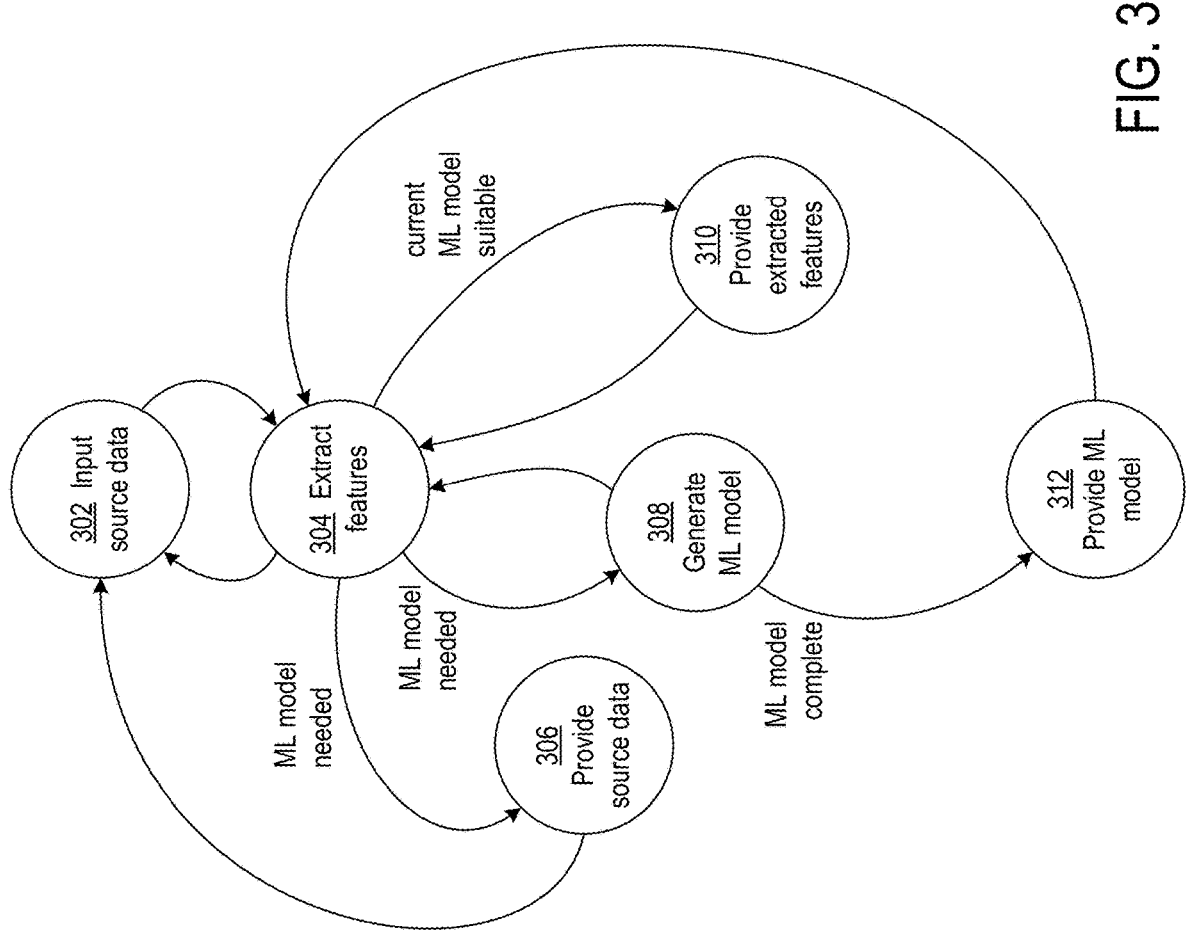
FIG. 3 shows a state diagram for an exemplary ML encoder circuit.

FIG. 3 shows a state diagram for an exemplary ML encoder circuit. At state 302, the ML encoder circuit inputs source data. The quantity and format of the data is that needed to extract relevant features for constructing an ML model and is dependent on the application.

Once a sufficient quantity of data has been input, the ML encoder circuit transitions to state 304, where features are extracted from the source data. The feature extraction algorithm employed can vary according to the intended application. Different feature extraction algorithms can be based on convolutional neural networks (CNNs) or recurrent neural networks (RNNs) or long-term recurrent convolutional networks (LRCNs). Example algorithms include, but are not limited to, facial detection, semantic segmentation, context-based image classification, hierarchy representation, back-propagation, multimodal, etc. The ML encoder circuit can operate in a continuous cycle of inputting source data at state 302 and extracting features in state 304.

Other states and actions of the ML encoder circuit depend on the suitability of the current ML model for decoding. If an initial ML is not yet available or a replacement ML model is needed, the ML encoder transitions to states 306 and 308. In an exemplary approach for determining whether or not current ML model is suitable, a current subset of the input source data can be compared to the previously input subset of the source data in state 302. If the difference, for example, the percentage of bytes that are not equal between the two subsets, exceeds a threshold suitable for the application, then the current ML model may be deemed unsuitable.

In state 306, the ML encoder circuit outputs the source data that was input in state 302 and returns to state 302. The ML encoder can optionally compress the source data prior to output using known compression algorithms. In state 308, the ML encoder circuit uses the features extracted in state 304 to generate the ML model and returns to state 304.

If the current ML model is suitable, the ML encoder circuit transitions to state 310, and in state 310 provides the features that were extracted in state 304. The ML encoder circuit transitions back to state 304 from state 310.

Once the ML encoder circuit completes an ML model in state 308, the ML encoder transitions to state 312, and in state 312 outputs the ML model. The ML encoder circuit transitions back to state 304 from state 312.

Figure 4:
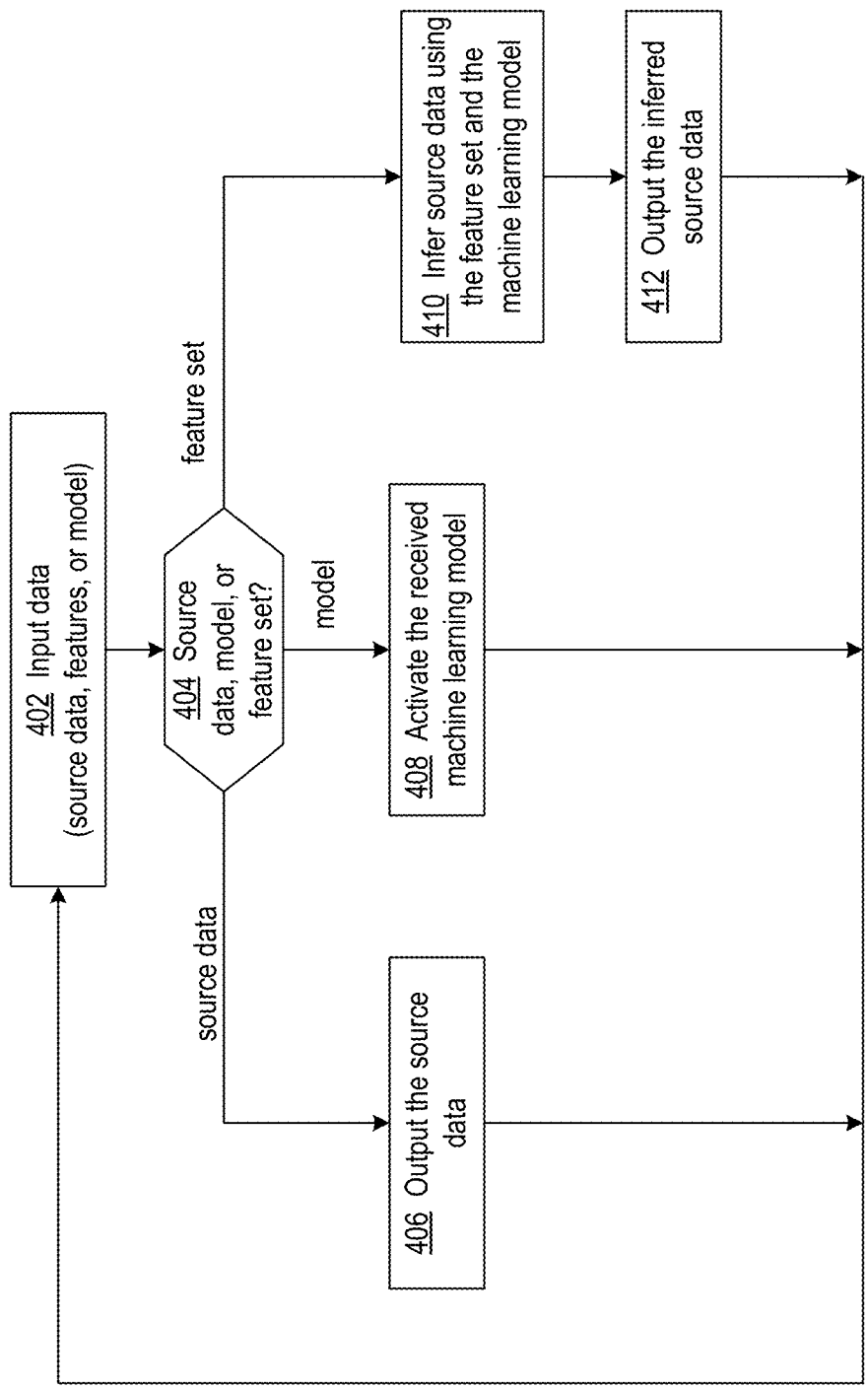
FIG. 4 shows a flowchart of operations performed by an exemplary ML decoder circuit.

FIG. 4 shows a flowchart of operations performed by an exemplary ML decoder circuit. At block 402, the ML decoder circuit inputs data provided by the ML encoder circuit. As indicated above, for real-time applications the data from the ML encoder circuit can be input as the ML encoder is providing the data. Alternatively, the data can be read from retentive storage for later decoding.

The data from the ML encoder circuit can be source data, an ML model, or features extracted from the source data. At decision block 404, the ML decoder circuit determines the type of data received. In an exemplary approach, the data can be tagged with information that indicates whether the data is source data, ML model data, or a feature set. In response to receiving source data, the ML decoder circuit outputs the source data at block 406 for further processing, such as by a video driver.

In response to receiving an ML model, at block 408 the ML decoder circuit activates the received ML model. The ML model can be activated by storing the ML model in working memory of the ML decoder circuit and referencing that ML model when inferring information based on an input feature set.

In response to receiving a feature set, at block 410 the ML decoder circuit infers source data from processing the feature set against the ML model. At block 412, the ML decoder circuit outputs the inferred source data.

Figure 5:
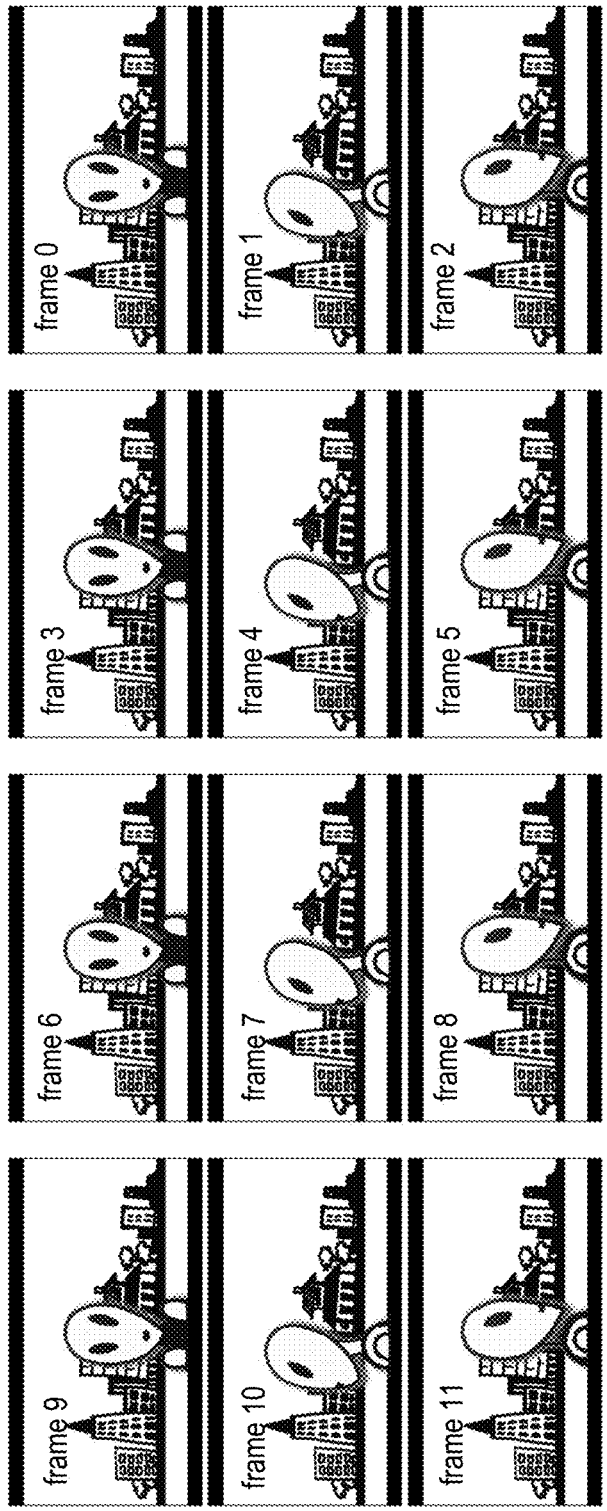
FIG. 5 shows an exemplary sequence of frames of source video data.
Figure 6:
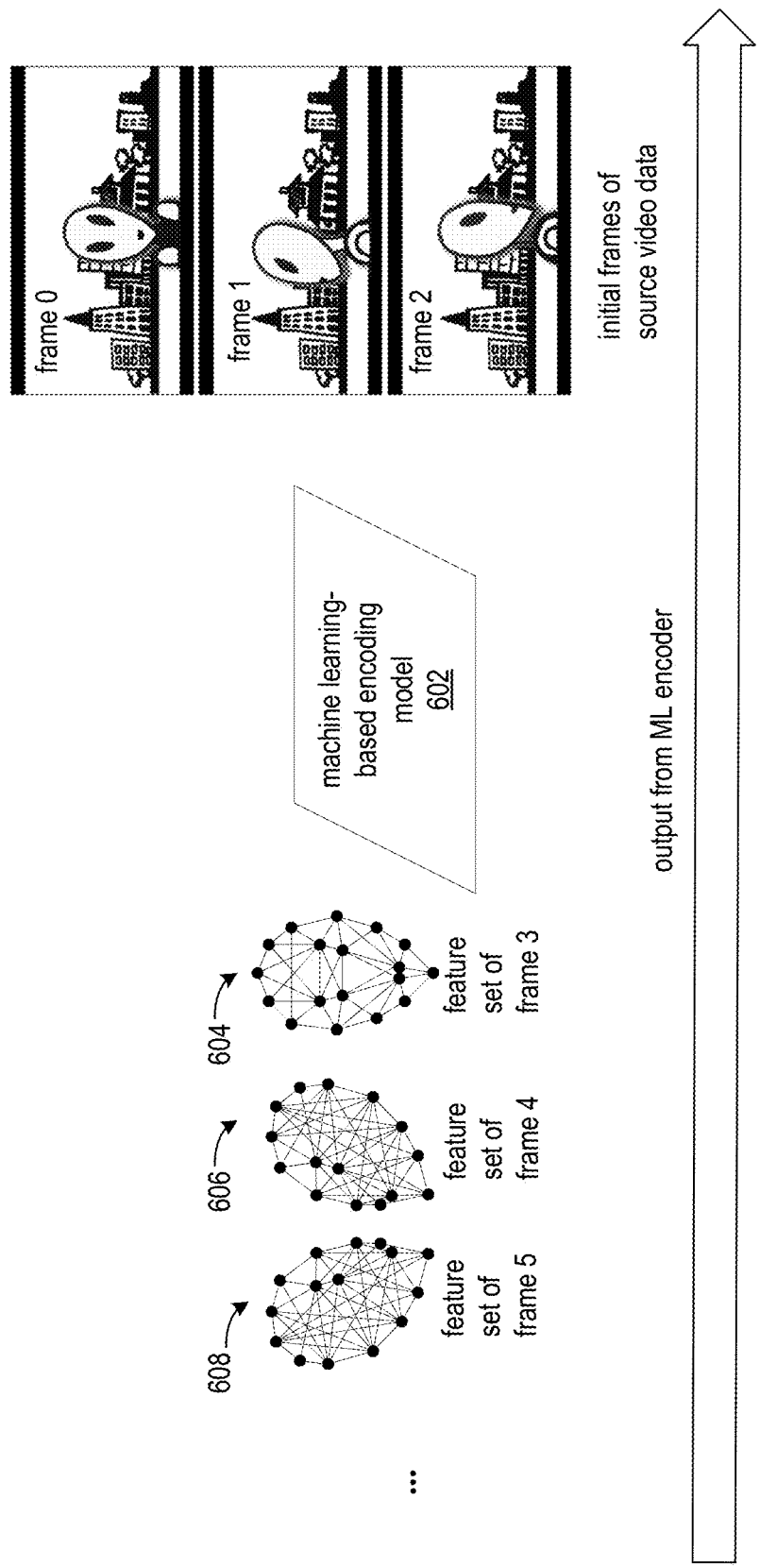
FIG. 6 shows output data from the ML encoder circuit based on the example of FIG. 5.

FIG. 5 shows an exemplary sequence of frames of source video data, and FIG. 6 shows output data from the ML encoder circuit based on the example of FIG. 5. The frames shown in FIG. 5 are numbered in order of input to an ML encoding circuit. In the exemplary sequence of frames, the alien's head and shoulder move, and the background is fixed.

In FIG. 6, frames 0, 1, and 2 are output by the ML encoder circuit while the ML circuit is generating the ML model 602 based on features extracted from frames 0, 2, and 2. Once the ML model 602 is complete, the ML encoder circuit outputs the ML model. For frames 3, 4, 5, etc., the ML encoder extracts features from the frame and outputs respective feature sets 604, 606, 608, . . . . In the example, facial features can be extracted.

The ML decoder circuit, in response to receiving feature sets 604, 606, and 608, infers the source data frames 3, 4, and 5 from FIG. 5. The inferred source data of the example can include the alien's head and shoulders and the background that remains static.

Figure 7:
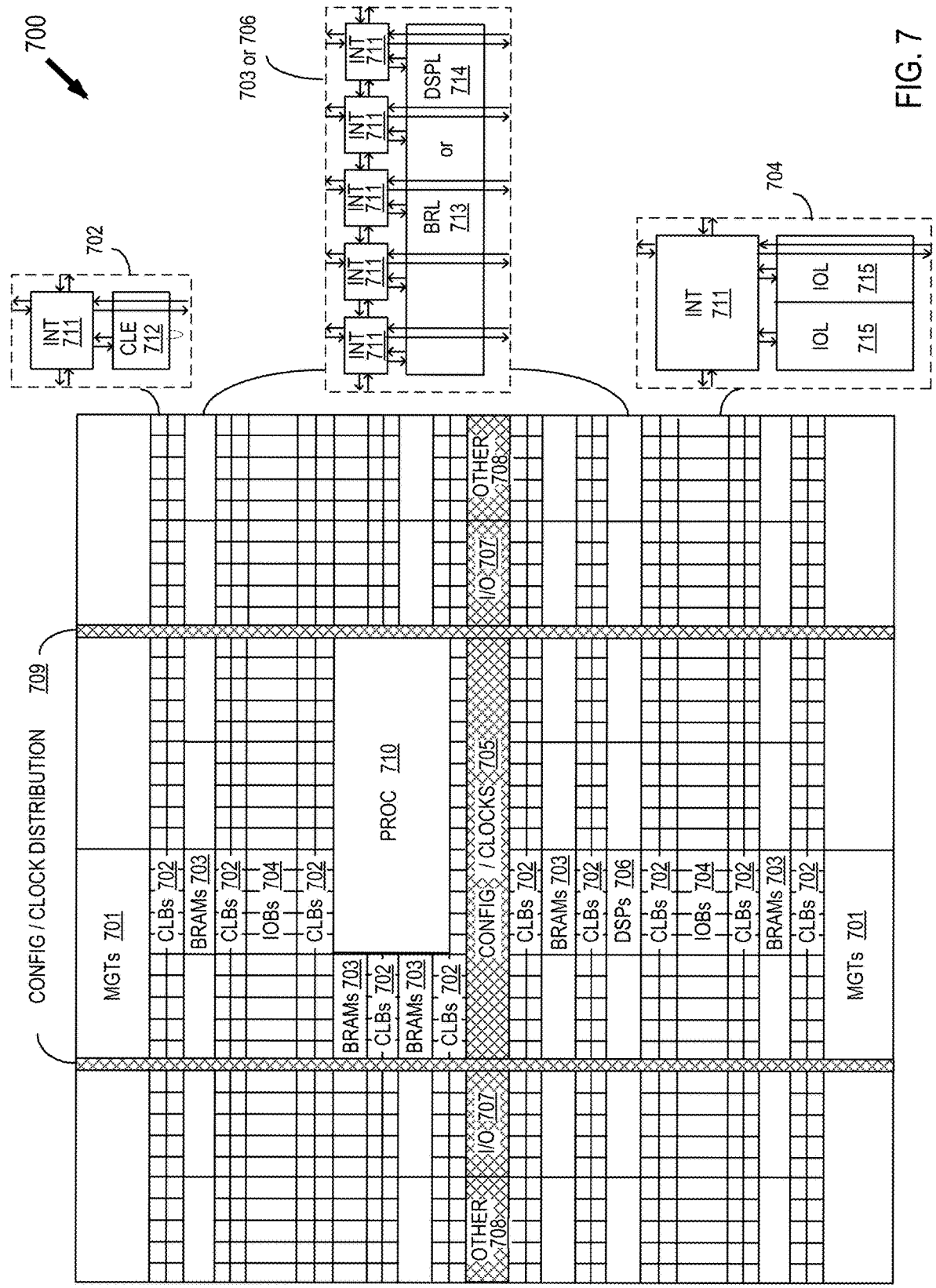
FIG. 7 shows a programmable integrated circuit (IC) on which the disclosed circuits and processes may be implemented.

FIG. 7 shows a programmable integrated circuit (IC) 700 on which the disclosed ML encoder circuit and ML decoder circuit and processes can be implemented. The programmable IC may also be referred to as a System On Chip (SOC) that includes field programmable gate array logic (FPGA) along with other programmable resources. FPGA logic may include several different types of programmable logic blocks in the array. For example, FIG. 7 illustrates programmable IC 700 that includes a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized input/output blocks (I/O) 707, for example, clock ports, and other programmable logic 708 such as digital clock managers, analog-to-digital converters, system monitoring logic, and so forth. Some programmable IC having FPGA logic also include dedicated processor blocks (PROC) 710 and internal and external reconfiguration ports (not shown). The disclosed methods and systems can also be implemented as ASICs or on an adaptive compute acceleration platform (ACAP). An ACAP has FPGA fabric with distributed memory and hardware-programmable DSP blocks, a multicore SoC, and one or more software programmable, yet hardware adaptable, compute engines, all connected through a network on chip (NoC).

In some FPGA logic, each programmable tile includes a programmable interconnect element (INT) 711 having standardized connections to and from a corresponding interconnect element in each adjacent tile. Therefore, the programmable interconnect elements taken together implement the programmable interconnect structure for the illustrated FPGA logic. The programmable interconnect element INT 711 also includes the connections to and from the programmable logic element within the same tile, as shown by the examples included at the top of FIG. 7.

For example, a CLB 702 can include a configurable logic element CLE 712 that can be programmed to implement user logic, plus a single programmable interconnect element INT 711. A BRAM 703 can include a BRAM logic element (BRL) 713 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 706 can include a DSP logic element (DSPL) 714 in addition to an appropriate number of programmable interconnect elements. An 10B 704 can include, for example, two instances of an input/output logic element (IOL) 715 in addition to one instance of the programmable interconnect element INT 711. As will be clear to those of skill in the art, the actual I/O bond pads connected, for example, to the I/O logic element 715, are manufactured using metal layered above the various illustrated logic blocks, and typically are not confined to the area of the input/output logic element 715.

A columnar area near the center of the die (shown shaded in FIG. 7) is used for configuration, clock, and other control logic. Horizontal areas 709 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 7 include additional logic blocks that disrupt the regular columnar structure making up a large part of the programmable IC. The additional logic blocks can be programmable blocks and/or dedicated logic. For example, the processor block PROC 710 shown in FIG. 7 spans several columns of CLBs and BRAMs.

Note that FIG. 7 is intended to illustrate only an exemplary programmable IC architecture. The numbers of logic blocks in the columns, the relative widths of the columns, the number and order of columns, the types of logic blocks included in the columns, the relative sizes of the logic blocks, and the interconnect/logic implementations included at the top of FIG. 7 are purely exemplary. For example, in an actual programmable IC, more than one adjacent column of CLBs is typically included wherever the CLBs appear, to facilitate the efficient implementation of user logic.

Those skilled in the art will appreciate that various alternative computing arrangements, including one or more processors and a memory arrangement configured with program code, would be suitable for hosting the processes and data structures disclosed herein. In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for encoding data. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method comprising:
    inputting a time-ordered sequence of source data to a machine learning (ML) encoder circuit;
    extracting by the ML encoder circuit, first features from a first subset of the source data; and
    generating an ML model from the first features by the ML encoder circuit;
    outputting the first subset of source data by the ML encoder circuit while generating the ML model and the ML model is incomplete;
    outputting by the ML encoder circuit in response to the ML model being complete, the ML model for decoding subsequently extracted features;
    extracting by the encoder circuit after extracting the first features, second features from a second subset of the source data, wherein the second subset of the source data follows the first subset of the source data in the sequence; and
    outputting by the ML encoder circuit in response to the ML model being complete, the second features for decoding using the ML model.

2. The method of claim 1, further comprising:
    comparing a third subset of the sequence source data to the second subset of the sequence of source data by the ML encoder circuit;
    determining by the ML encoder circuit, whether a difference between the second subset and the third subset of the source data exceeds a threshold;
    extracting by the ML encoder circuit, third features from the third subset of the source data;
    in response to the difference exceeding the threshold:
        generating a replacement ML model from the third features by the ML encoder circuit,
        outputting the third subset of source data by the ML encoder circuit while generating the replacement ML model and the replacement ML model is incomplete, and
        outputting the replacement ML model by the ML encoder circuit; and
    outputting the third features by the ML encoder circuit in response to the difference not exceeding the threshold.

3. The method of claim 1, wherein:
    the outputting the first subset of source data includes storing the first subset of source data in retentive storage for subsequent retrieval;
    the outputting the ML model includes storing the ML model in retentive storage for subsequent retrieval and use in decoding stored features; and
    the outputting the second features includes storing the second features in retentive storage for subsequent retrieval and decoding using the ML model.

4. The method of claim 1, wherein:
    the outputting the first subset of source data includes transmitting the first subset of source data to an ML decoder circuit for outputting;
    the outputting the ML model includes transmitting the ML model to the ML decoder circuit for use in decoding transmitted features; and
    the outputting the second features includes transmitting the second features to the ML decoder circuit for decoding using the ML model.

5. The method of claim 1, wherein the source data includes frames of video data.

6. The method of claim 1, wherein the source data includes blocks of audio data.

7. The method of claim 1, further comprising:
    inputting the first subset of source data, the ML model, and the second features by an ML decoder circuit;
    outputting the first subset of source data by the ML decoder circuit in response to receipt of the first subset of source data; and
    decoding the second features by the ML decoder circuit using the ML model in response to receipt of the second features and the ML model.

8. The method of claim 7, further comprising:
comparing a third subset of the sequence source data to the second subset of the sequence of source data by the ML encoder circuit;
determining by the ML encoder circuit, whether a difference between the second subset and the third subset of the source data exceeds a threshold;
extracting by the ML encoder circuit, third features from the third subset of the source data;
in response to the difference exceeding the threshold:
generating a replacement ML model from the third features by the ML encoder circuit,
outputting the third subset of source data by the ML encoder circuit while generating the replacement ML model and the replacement ML model is incomplete, and
outputting the replacement ML model by the ML encoder circuit;
extracting by the ML encoder circuit after extracting the third features, fourth features from a fourth subset of the source data;
outputting by the ML encoder circuit, the fourth features for decoding using the ML model;
inputting the third subset of source data, the replacement ML model, and the fourth features by the ML decoder circuit;
outputting the third subset of source data by the ML decoder circuit; and
decoding the fourth features by the ML decoder circuit using the replacement ML model.

9. A method comprising:
inputting to a machine learning (ML) decoder circuit, a time-ordered sequence of data output by an ML encoder circuit, wherein the sequence of data includes in input order a first subset of source data, a first ML model, and a first set of features;
outputting the first subset of source data by the ML decoder circuit in response to input of the first subset of source data;
decoding the first set of features into a first set of inferred source data by the ML decoder circuit using the first ML model in response to input of the first set of features; and
outputting the first set of inferred source data by the ML decoder circuit.

10. The method of claim 9, wherein the sequence of data includes a second set of features following the first set of features, and the method further comprising:
decoding the second set of features into a second set of inferred source data by the ML decoder circuit using the first ML model after decoding the first set of features; and
outputting the second set of inferred source data by the ML decoder circuit after outputting the first set of inferred source data.

11. The method of claim 10, wherein the sequence of data includes a second subset of source data following the second set of features, a second ML model following the second subset of source data, and a third set of features following the second ML model, and the method further comprising:
outputting the second subset of source data by the ML decoder circuit after outputting the second set of inferred source data and in response to input of the second subset of source data;
decoding the third set of features into a third set of inferred source data by the ML decoder circuit using the second ML model after inputting the second ML model; and
outputting the third set of inferred source data by the ML decoder circuit after outputting the second subset of source data.

12. The method of claim 10, wherein the inputting includes reading the sequence of data from retentive storage.

13. The method of claim 10, wherein the inputting includes receiving the sequence of data in real-time from the ML encoder circuit.

14. A system comprising:
a machine learning (ML) encoder circuit configured to perform operations including:
inputting a time-ordered sequence of source data;
extracting first features from a first subset of the source data; and
generating an ML model from the first features;
outputting the first subset of source data while generating the ML model and the ML model is incomplete;
outputting the ML model for decoding subsequently extracted features in response to the ML model being complete;
extracting after extracting the first features, second features from a second subset of the source data, wherein the second subset of the source data follows the first subset of the source data in the sequence; and
outputting the second features for decoding using the ML model in response to the ML model being complete.

15. The system of claim 14, wherein the ML encoder circuit is further configured to perform operations including:
comparing a third subset of the sequence source data to the second subset of the sequence of source data;
determining whether a difference between the second subset and the third subset of the source data exceeds a threshold;
extracting third features from the third subset of the source data;
in response to the difference exceeding the threshold:
generating a replacement ML model from the third features,
outputting the third subset of source data while generating the replacement ML model and the replacement ML model is incomplete, and
outputting the replacement ML model; and
outputting the third features in response to the difference not exceeding the threshold.

16. The system of claim 14, wherein the ML encoder circuit is further configured to perform operations including:
storing the first subset of source data in retentive storage for subsequent retrieval;
storing the ML model in retentive storage for subsequent retrieval and use in decoding stored features; and
storing the second features in retentive storage for subsequent retrieval and decoding using the ML model.

17. The system of claim 14, wherein the ML encoder circuit is further configured to perform operations including:
transmitting the first subset of source data to an ML decoder circuit for outputting;
transmitting the ML model to the ML decoder circuit for use in decoding transmitted features; and
transmitting the second features to the ML decoder circuit for decoding using the ML model.

18. The system of claim 14, wherein the source data includes frames of video data.

19. The system of claim 14, wherein the source data includes blocks of audio data.

20. The system of claim 14, wherein the ML encoder circuit is implemented on a programmable integrated circuit.

* * * * *